Figures 1, 2:
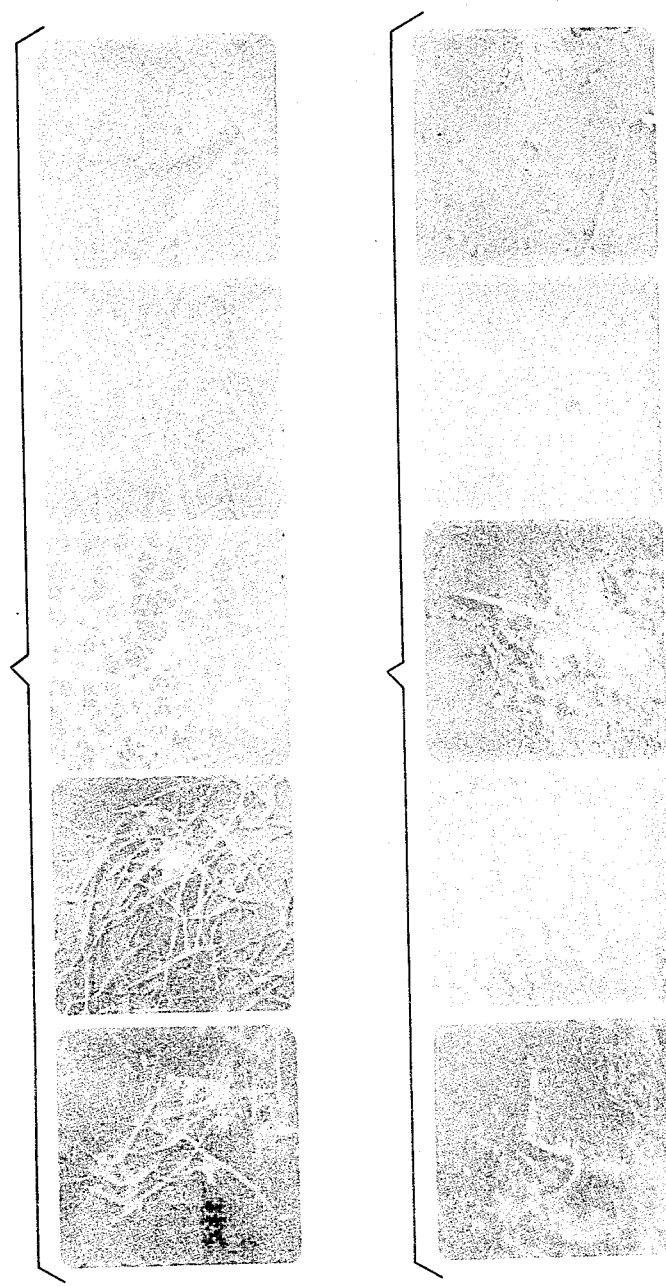

Laurence F. King    Inventor
By Edwin M. Thomas Attorney

United States Patent Office 2,820,762
Patented Jan. 21, 1958

2,820,762

MIXED HYDROXY FATTY ACID-UNSATURATED FATTY ACID THICKENED GREASE COMPOSITIONS

Laurence F. King, Sarnia, Ontario, Canada, assignor to Esso Research and Engineering Company, a corporation of Delaware Continuation of application Serial No. 279,831, April 1, 1952. This application June 14, 1954, Serial No. 436,354

18 Claims. (Cl. 252—18)

The present invention relates to anti-friction bearing lubricating greases and particularly to heavy duty lubricating greases which are particularly suitable for the long life lubrication of railway car journals mounted in roller bearings, and for comparable heavy machinery. Roller bearings are coming into increased use in railway rolling stock, because they reduced starting power requirements considerably. They have been found rather difficult to lubricate satisfactorily for periods of long service. Such lubrication is highly essential for railroad service.

In the prior art the plain bearing journals of railroad cars have usually been lubricated with oil applied to fibrous material such as cotton waste and the like. These relatively new types of bearing, of course, cannot be lubricated with oil and waste in the conventional way. Since lubricating oils drain away from roller bearings and leave them unprotected it is necessary to use thickened oils or greases. Among other requirements, greases for railroad roller bearing application must be highly resistant to oxidation. Ordinarily they are required to pass a drastic performance test in this respect. Some railroads require that greases must give satisfactory lubrication for 350,000 miles which amounts to three to four years of average normal operation. It is important that such lubricants show no substantial tendency to thicken during this period or to harden in consistency. This hardening factor appears to be particularly critical in certain of the Hyatt types of roller bearing which are commonly used for railroad car journals. To a lesser degree, however, the same requirements apply to other standard antifriction bearings of popular manufacture which are widely used.

Some of the bearings mentioned above are designed so as to require a soft grease which can be pumped at the temperature of operation through an orifice to a friction thrust block. The temperature of operation, of course, varies under different conditions but usually does not exceed about 175° F. Standing equipment, of course, may drop to temperatures much below zero in some cases.

Many conventional greases which perform entirely satisfactorily in normal ball or roller bearing service are quite unsuitable for lubricating some of the bearings mentioned above as used in railroad car journals. The lubricants fail commonly because the severe shear or mechanical working which occurs in the bearings hardens the greases to an intolerable degree. Generally speaking, a hardness indicated by ASTM penetration below 200 exceeds the allowable limit. In other instances a grease which hardens sufficiently in other bearings will be worked out or thrown out of the bearings to some extent, and to this extent will be replaced with a softer portion of the grease. This does not occur in some of the Hyatt type bearings. When hardening occurs in these cases, the greast does not reach the thrust block at all. Bearing failure frequently ensues in such circumstances. This has been demonstrated in actual railroad tests on one of the larger railroads in recent years.

A further factor which makes many lubricating greases unsatisfactory is the exposure to water which so often occurs in railway service. Satisfactory greases must show a reasonably good resistance to the washing action of water. Although bearings, especially those used in railroad service, are designed to keep out water to a good degree, water often penetrates the bearing housings under unusual conditions. Greases must be reasonably stable in consistency in the presence of water. The soap content must not be washed out or the grease emulsified to an undue degree.

Since railway rolling stock is used in various seasons and under various operating conditions the grease must provide adequate lubrication over a wide temperature range. This places further limitations upon the type of grease that can be used.

Experience has shown that greases having the following general characteristics are satisfactory for the roller bearings of railroad car journals. In general, they have been approved by the railroads:

(a) They should contain a soda or soda-lime soap of a fat or fatty acid preferably having an iodine number less than 30, preferably between 15 and 30. This is to impart reasonable water resistance to the grease; those from high iodine number fat have a greater tendency to emulsify in the presence of water.

(b) The soap content should be low (approximately 7 to 17%, 8 to 13% being preferred) to give an ASTM worked penetration of 340–370 and thus ensure good pumpability throughout the temperature range encountered.

(c) The mineral oil should be of fairly high viscosity index, at least 50 and preferably 80 or higher, so as to obtain optimum performance over a wide temperature range and to impart better oxidation characteristics. The desired viscosity range of the oil is 300–1000 S. S. U. at 100° F., preferably 300 to 500, though a slightly higher viscosity of oil can be used in the warmer climates.

(d) Other requirements such as oil separation characteristics, corrosion promoting tendencies, and mechanical stability are also important and are discussed below.

It has recently been demonstrated that a very great improvement in the oxidation characteristics of lubricating greases in high temperature service can be attained by adding sodium phosphate. This applies particularly to the soda soap greases and soda-lime soap greases which are about equivalent in this respect. In a copending application, Serial No. 230,415, filed June 7, 1951, now abandoned, by the present applicant and a co-inventor, a number of examples are given showing the improvement in oxidation resistance obtained by using sodium phosphate. Sodium phosphate also improves the yield or the consistency for a given soap content and it makes it possible to formulate a stable grease, using as a base oil a highly refined mineral lubricating oil of high viscosity index.

In the prior art the low viscosity index oils have usually been chosen for the manufacture of lubricating greases. They are less susceptible to oil separation and they form a more stable grease structure than the oils of high viscosity index. For lubricating service over a wide range of temperatures, however, the oils of high viscosity index have obvious advantages. One aspect of the present invention is the discovery of a method by which oils of high viscosity index may be used to make high quality lubricating greases for antifriction bearings which can withstand severe service over long periods of time.

According to the present invention it has been further discovered that the use of a hydroxy fatty acid in lieu of the conventional fatty acid gives further improvement in yield and in improved resistance to mechanical breakdown on working. In particular, it is found to be advantageous to use 12-hydroxy stearic acid as a soap forming constituent.

In order to stabilize the soap in an oil of high viscosity index an attempt was made to use a small proportion of sodium sulfonate as the dispersing agent. A grease employing the soda-lime soap of 12-hydroxy stearic acid and a mineral lubricating oil of high viscosity index was prepared using 0.8% by weight, on a dry basis, of sodium sulfonate. This product appeared to be suitable in all respects except that excessive hardening took place when a trace of water was present in the grease and the product was heated to 200° F. for 1 hour and cooled without agitation. Quantities of water of the order of 0.1% were sufficient to cause this objectionable hardening. The product became dry and crumbly, approaching a block grease in hardness (33 micro penetration approximately 150 mm./10 ASTM penetration) and was entirely unsatisfactory for lubricating journal roller bearings of the type described above.

The product described above was worked in a standard ASTM grease worker and restored approximately to its original consistency but it would not be usable in a standard Hyatt roller bearing of railroad journal type and was considered unsatisfactory for service.

It appears that greases for bearing service of the type under consideration preferably should be relatively soft, having a worked penetration not greater than 340 to 370 mm./10. Further experimental work was required to overcome the hardening phenomenon. It was found that the hardening phenomenon was more or less peculiar to a composition containing 12-hydroxy stearic acid soap of lime and soda (or of soda base alone) with sodium phosphate in the presence of a trace of water. The mixed soda-lime grease has somewhat superior water resistance over straight soda base grease.

When no water was present several greases were found to be quite free from hardening in service. Thus, the conventional soda and soda-lime greases prepared from stearic or oleic acids or fats containing them were satisfactory. This was true also of greases prepared from 12-hydroxy stearic acid but containing no sodium phosphate, as well as conventional greases containing sodium phosphate, and conventional greases containing sodium phosphate plus sodium sulfonate.

However, the combination of greases prepared from 12-hydroxy stearic acid with sodium phosphate were unsatisfactory despite their superior characteristics as regards oxidation stability. This particular combination is susceptible to hardening in the presence of water.

Electron micrographs were taken of an experimental grease described above, which contained sodium sulfonate, before and after the hardening test. These are shown in the drawings, Fig. 1 and 2. It will be observed that a distinct change occurred in the type of dispersion of soap particles during the heating and cooling cycle. The grease represented in these photographs was the soda-lime base product, the soap being derived from 12-hydroxy stearic acid, containing about 1% sodium phosphate. Fig. 1 shows the grease (K-2387 before oil dilution) before the hardening test and Fig. 2 shows the same grease after the hardening test. Long soap crystals which existed in the original grease were disrupted and broken down into much shorter ones by the test procedure. The very small quantity of water, much less than stoichiometrical proportions, indicates that hardening is not due simply to hydration of the soap. Many changes in the formulation were made in attempts to overcome this difficulty. When the sodium sulfonate was omitted a product of low yield was obtained. It had a 375 mm./10 penetration with 16% soap content. It was too soft when new and became excessively hard in roller bearing service. Furthermore, the soap was not well dispersed. Plasticizing agents such as glycerine, diethylene glycol, polyethylene glycol, diethanol amine, methyl cellusolve, and the like were totally ineffective in limiting the hardening tendency.

Attempts were made to improve the grease by substituting other fatty materials for part of the 12-hydroxy stearic acid. When 25% of the acid was replaced with stearic acid there was little improvement. Replacement of a major part of the 12-hydroxy stearic acid with stearic acid gave some improvement in hardening tendency but resulted in considerable loss in mechanical stability to shear. Furthermore, it increased bleeding tendencies on storage. Stearic acid, alone or in combination with sodium sulfonate, was also found to be unsatisfactory since it gave a grease of poor yield, 16.6% soap required for a worked penetration of 355 mm./10, and poor storage stability, the grease softening on storage.

According to the present invention it has been discovered that a replacement of a minor part, approximately 15 to 35%, of the 12-hydroxy stearic acid with an unsaturated fat or fatty acid will practically eliminate the hardening tendency and at the same time improve mechanical stability. The yield is lowered somewhat by the incorporation of unsaturated fatty acid alone. This can be restored, however, in a grease of approximately 12 to 13% soap content, by addition of a small quantity, about 0.5 to 0.7% by weight, based on the total composition, of a hydroxy compound, preferably glycerine or ethylene glycol. The lower polyethylene glycols also can be used, i. e. those of molecular weight below about 1500 or so.

The maximum amount of 12-hydroxy stearic acid that can be replaced with unsaturated fat or fatty acid is limited. In general, it must be a minor proportion as noted above and the mixture should have an iodine number between about 15 and 40 before saponification, preferably a 15 to 30 iodine number. It appears to be necessary to have present a small amount of the glycerine or similar hydroxy compound in order to obtain good consistency at relatively low soap contents. Mixtures of conventional saturated fatty acids such as stearic acid and oleic acid are entirely unsuitable. Such greases are still fluid with soap concentrations as high as 15%. Furthermore, they have little resistance to mechanical breakdown on working.

The combination of soap of 12-hydroxy stearic acid with a minor proportion of unsaturated fat or fatty acid of the $C_{12}$ to $C_{22}$ range, such as oleic acid or acidless tallow, cottonseed oil and like materials is preferred. The composition should include 0.5 to 4% by weight of trisodium phosphate and 0.2 to not more than 1% of glycerine or glycol. For service under varying temperature conditions, mineral lubricating oils of high viscosity index, of at least 80 and preferably a little higher should be used as the liquid constituent. Oils having a viscosity index between 50 and 75 are easier to thicken to stable gels and are quite satisfactory for most service. Greases of higher viscosity index may be manufactured as follows, according to the present invention.

The fatty acids and an approximately equal weight of mineral oil are charged to a grease kettle. This portion of the oil may be of preferably slightly lower viscosity index than the average of the final product to facilitate formation of a soap concentrate. Thus, oil of about 50 to 75 viscosity index or slightly lower may be used at first. The mixture is heated to about 150° F. and the saponifying agent or agents are added, together with water. Thus, for a soda-lime grease appropriate proportions of NaOH and lime are added in aqueous solution or slurry. The resulting soap is cooked to a temperature of 300 to 325° F. (using about 100 pounds steam pressure in a steam cooker) until the product is thoroughly dry. At this point the free alkali content of the soap should be approximately 0.1 to 0.3%. It is preferred that the product not be acidic at this point because this results in poor color stability and loss of yield.

The sodium phosphate (which is preferably trisodium phosphate, though disodium phosphate may be used in cases where oxidation life is less important) is then added in aqueous solution. The soap-salt mixture is cooked until a complex is formed which is essentially anhydrous.

Small quantities of water may be added at the cooking temperature, however, to insure optimum dispersion of the salt in the soap and of the complex in the oil. The product should be heated further until thoroughly dry.

Thereafter the remainder of the lubricating oil is added slowly. A further proportion of the lower viscosity index oil may be used first, followed by addition of oil of higher viscosity index to raise the average viscosity index of the final product. The product is then cooled with stirring and at a temperature of approximately 275° F., the glycerine or glycol is added, followed by addition of a very small amount of water (about 0.1% preferably) when the temperature has dropped to about 225° F. This smooths out the product and the grease should be further stirred down in the kettel to a temperature of about 160° F. Thereafter it can be drawn out and packaged.

The effect on the micro penetration of soda-lime greases containing sodium phosphate prepared under conditions indicated with a mineral oil of 85 average viscosity index is shown in Table I.

TABLE I

*Effect of heating on the micro penetration of soda-lime greases containing sodium phosphate* [1]

| Designation | Soap stock | Soap wt. percent | Plasticizing agent, wt. percent | A. S. T. M., wkd. pen. | Micro penetration (taken at 77° F.) | | | |
|---|---|---|---|---|---|---|---|---|
| | | | | | Grease | | Grease+0.25% water | |
| | | | | | Original | After 1 hr. at 200° F. | Original | After 1 hr. at 200° F. |
| K-2387 | 12-Hydroxy stearic acid | 10.5 | Sodium sulphonate (dry), 0.8. | 345 | 152 | 109 | 138 | 33 |
| K-2388 | Stearic acid | 16.6 | Sodium sulphonate (dry), 0.9. | 355 | 165 | 132 | 172 | 92 |
| K-2390 | Stearic acid (3 parts), 12-OH stearic acid (1 part). | 15.0 | Sodium sulphonate (dry), 0.8. | 337 | 137 | 103 | 117 | 74 |
| K-2429 | 12-OH stearic acid (3 parts), stearic acid (1 part). | 10.6 | Glycerin, 0.5 | 345 | 135 | 88 | 87 | 44 |
| K-2426 | 12-OH stearic acid (3 parts), oleic acid (1 part). | 19.2 | | 340 | 145 | 122 | 140 | 106 |
| K-2427 | 12-OH stearic acid (3 parts), oleic acid (1 part). | 12.6 | Glycerin, 0.6 | 355 | [2] 152 | 102 | 137 | 110 |

[1] Prepared in laboratory at 300–325° F. using 400 S. S. U. viscosity at 100° F., 85 V. I. mineral oil. All greases contain approx. 1% by weight $Na_3PO_4$ (anhydrous) as a complex with the soap. Ratio of soda to lime soap is constant (4:1).
[2] Original grease contains 0.1% water.

NOTE.—A grease approved for railroad car journal service changed in micro penetration on this test from 160 to 82; in presence of 0.25% $H_2O$, from 145 to 190.

Table II shows the specifications of various users and the results obtained with various commercial products in comparison with the product just described which is designated "New Product." Blanks indicate that the data were not obtained

TABLE II

*Formulae and inspections of grease for railroad car journal box roller bearings*

| | Railroad specification [1] | Timken spec'n | Approved product | New product |
|---|---|---|---|---|
| Formula, percent by wt.: | | | | |
| 12-hydroxy stearic acid | | | | 9.7. |
| Oleic acid | | | | 2.9. |
| Sodium hydroxide (dry) | | | | 1.8. |
| Hydrated lime | | | | 0.4. |
| Trisodium phosphate | | | | 2.6. |
| Mineral oil (300 S. U. S., V/100, 75 V. I.). | | | | 40.0. |
| Mineral oil (550 S. U. S., V/100, 95 V. I.). | | | | 41.9. |
| Water | | | | 0.1. |
| Glycerin | | | | 0.6. |
| Inspections: | | | | |
| General | Soda or soda-lime soap-refined oil+oxidation inhibitor; no fillers. | | Soda-lime soap refined oil oxidation inhibitor, no fillers. | Soda-lime soap refined oil oxidation inhibitor, no fillers. |
| Mineral oil: | | | | |
| Flash, ° F | | 340 (min.) | | 460. |
| Fire, ° F | | 380 (min.) | | 495. |
| V/100° F., S. S. U | 450–800 (desired) | | 410 | 400. |
| V/210° F., S. S. U | | 50–75 | 58 | 57. |
| V. I | 80 (min.) | | 94 | 85. |
| Pour, ° F | | 0 (max.) | +10 | +30. |
| Soap | | | | 4:1. |
| | {Min. ratio soda-lime of 6:1 | Approx. 10% | 8.9 | 12.6. |
| | {Max. content 13% | | | |
| Oxidation inhibitor | Road service tests of 350,000 miles minimum on the finished grease. No evidence of oxidation. | | | |
| Copper corrosion, ASTM D130-49T. | None | None | Pass | Pass. |
| ASTM wkd. pen | 340–370 | 340–370 | 354 | 355. |
| ASTM dropping pt., ° F | 325 (min.) | 325 (min.) | 356 | 326. |
| Water, percent | 0.5 (max.) | 0.5 (max.) | 0.05 | 0.1. |
| Ash, percent | 1.2 (min.) | | | |
| Free alkali, percent | 0.5 (max.) | 0.5 (max.) | 0.14 | 0.45. |
| Colour | | Light | Light | Light. |

Table II—Continued
Formulae and inspections of grease for railroad car journal box roller bearings

| | Railroad specification [1] | Timken spec'n | Approved product | New product |
|---|---|---|---|---|
| Stability: After 5,000 strokes in ASTM grease worker, increase in penetration mm./10. | | 50 (max.) | 22 | 20. |
| After 6 months' storage | | 20 (max.) (no bleeding) | | |
| Compatibility | | Pass road service test when mixed with approved greases. | | |
| Oil separation (bleeding): (a) 10 g. grease on 6 mesh galvanized screen for 24 hours at 210° F. Bleeding, percent. | 10 (max.) | | 8 | 2. |
| (b) 185 g. grease in 28 mesh galvanized cone for 100 hours at 200° F. | | | 13.7 | 9.7. |

[1] Railroad specification is based on the requirements of a large eastern railroad in the United States and Canada.

TABLE III
Grease hardening tests on car journal greases [1]

| Designation | Soap stock | Time required to reach micropenetration of 50 on grease, hours |
|---|---|---|
| K-2387 | 12-hydroxy stearic acid | 1,500 |
| K-2388 | Stearic acid | 450 |
| K-2390 | Stearic acid (3 parts) 12-OH stearic acid (1 part). | 1,200 |
| K-2429 | 12-OH stearic acid (3 parts) stearic acid (1 part). | 1,750 |
| K-2427 | 12-OH stearic acid (3 parts) oleic acid (1 part). | 3,000+ |
| Approved product (railroad specification). | | 1,400 |

[1] N. L. G. I. spindle test bearing packed with grease and placed in oven at 200° F.

The results in Table III are, of course, obtained from accelerated tests at temperatures of 200° F. which are substantially higher and hence much more severe than in actual service.

It will be understood that the lubricating oil may include conventional anti-oxidants, metal deactivators, tackiness agents, viscosity index improvers, and other usual additives in conventional quantities.

This application is a continuation of copending application, Serial No. 279,831, filed April 1, 1952, now abandoned.

What is claimed is:

1. A heavy duty lubricating grease composition consisting essentially of about 80–92% by weight of a mineral base lubricating oil of viscosity index of at least 50, 7 to 17% by weight, based on the total composition of a sodium containing soap derived from a fatty material with iodine number between 15 and 40, said fatty material comprising about 65–85% by weight of 12-hydroxy stearic acid and about 15–35% by weight of unsaturated fatty acid of the $C_{12}$ to $C_{22}$ range, and 0.2 to 1.0% of a hydroxy compound selected from the class which consists of glycerine and glycol.

2. Composition according to claim 1 containing 0.5 to 4%, based on the weight of the soap, of a sodium phosphate containing at least two atoms of sodium per molecule.

3. Composition according to claim 2 wherein said sodium phosphate is trisodium phosphate.

4. A lubricating grease composition consisting essentially of about 80–92% by weight of a mineral base lubricating oil having a high viscosity index of at least 80, and about 8 to 13% by weight, based on the total composition, of a soda-lime soap composed of about 65–85% by weight of 12-hydroxy stearic acid and about 15–35% by weight of oleic acid, said soap also containing about 0.5–4% by weight based on total soap of a sodium phosphate having at least 2 sodium atoms per molecule, and 0.2 to 0.9% of a hydroxy compound selected from the class which consists of glycerine and glycol.

5. Composition according to claim 4 wherein said phosphate is trisodium phosphate.

6. A heavy duty long life lubricant composition of soft grease consistency for railway journal bearings and the like, consisting essentially of about 80 to 92% by weight, based on the total composition, of mineral base lubricating oil of 200 to 600 S. S. U. viscosity at 210° F. and average viscosity index at least 80, 7 to 17% of soda-lime soap composed of about 65–85% by weight of 12-hydroxy stearic acid and about 15–35% by weight of oleic acid, said mixture of acids having an iodine number between 15 and 40, 0.5 to 4%, based on total soap, of trisodium phosphate complexed with said soap and 0.2 to not more than 1% total of glycerine plus a trace of water.

7. Composition according to claim 6 containing about 10 to 14% soap and 2 to 3% trisodium phosphate on a hydrate salt basis.

8. Process for manufacturing a lubricating grease which comprises making a concentrate of a grease-making sodium soap in mineral lubricating oil of viscosity index below that desired in the final product, adding a sodium phosphate of at least two sodium atoms per molecule, cooking to dehydrate, working in additional oil of higher viscosity index to bring the average viscosity index up to at least 80 and to adjust the soap content of the final product to be in the range of 7 to 17 wt. percent, cooling while working and adding 0.2 to 0.9% by weight, based on the total composition, of a hydroxy material selected from the class which consists of glycerine, ethylene glycol and polyethylene glycol during cooking.

9. The process of claim 8 in which said soap is a mixture of sodium-containing soaps of 12-hydroxy stearic acid and an unsaturated fatty acid of the $C_{12}$–$C_{22}$ range.

10. A heavy duty lubricating grease composition comprising a major proportion of a mineral base lubricating oil of viscosity index of at least 50, in the range of 7 to 17 wt. percent of a sodium-containing soap derived from a fatty material with iodine number between 15 and 40, said fatty material comprising about 65–85% by weight of a hydroxy fatty acid and about 15–35% by weight of unsaturated fatty acid of the $C_{12}$ to $C_{22}$ range, and a still lesser grease-yield improving proportion of a hydroxy compound selected from the class which consists of glycerine and glycols.

11. Composition according to claim 10 containing a minor oxidation-inhibiting proportion of a sodium phosphate containing at least two atoms of sodium per molecule.

12. Composition according to claim 11 wherein said sodium phosphate is trisodium phosphate.

13. A lubricating grease composition comprising a major proportion of a mineral base lubricating oil having a high viscosity index of at least 80, and in the range of 7 to 17 wt. percent of a soda-lime soap composed of about 65–85% by weight of a hydroxy fatty acid and about 15–35% by weight of oleic acid, said soap also containing a minor oxidation-inhibiting proportion of a sodium phosphate having at least 2 sodium atoms per molecule, and a minor grease-yield improving proportion of a hydroxy compound selected from the class which consists of glycerine and glycols.

14. Composition according to claim 13 wherein said phosphate is trisodium phosphate.

15. A heavy duty long life lubricant composition of soft grease consistency for railway journal bearings and the like, comprising a major proportion of mineral base lubricating oil of 200 to 600 S. S. U. viscosity at 210° F. and average viscosity index at least 80, in the range of 7 to 17 wt. percent of soda-lime soap composed of about 65–85% by weight of a hydroxy stearic acid and about 15–35% by weight of oleic acid, said mixture of acids having an iodine number between 15 and 40, a minor oxidation-inhibiting proportion of trisodium phosphate complexed with said soap, and about 0.2 to about 1% total of glycerine plus a trace of water.

16. Composition according to claim 15 containing about 10 to 14% soap and 2 to 3% trisodium phosphate on a hydrate salt basis.

17. Process for manufacturing a lubricating grease which comprises making a concentrate of a grease-making sodium soap in mineral lubricating oil of viscosity index below that desired in the final product, adding a sodium phosphate of at least two sodium atoms per molecule, cooking to dehydrate, working in additional oil of higher viscosity index to bring the average viscosity index up to at least 50 and to adjust the soap content of the final product to be in the range of 7 to 17 wt. percent, cooling while working and adding a minor grease yield-improving proportion of a hydroxy material selected from the class which consists of glycerine, ethylene glycol and polyethylene glycol during cooking.

18. The process of claim 17 in which said soap is a mixture of sodium-containing soaps of a hydroxy stearic acid and an unsaturated fatty acid of the $C_{12}$–$C_{22}$ range.

References Cited in the file of this patent

UNITED STATES PATENTS

| | | |
|---|---|---|
| 2,450,149 | McCarthy | Sept. 28, 1948 |
| 2,455,659 | Duncan et al. | Dec. 7, 1948 |
| 2,468,099 | Morway | Apr. 26, 1949 |
| 2,581,127 | Morway et al. | Jan. 1, 1952 |
| 2,678,918 | Bondi | May 18, 1954 |